United States Patent
Lee et al.

(10) Patent No.: US 8,936,759 B2
(45) Date of Patent: Jan. 20, 2015

(54) DOUBLE HELIX TYPE GAS HYDRATE REACTOR

(75) Inventors: Ju Dong Lee, Busan (KR); Jin Woo Lee, Busan (KR); Kyeong Nam Park, Busan (KR); Joung Ha Kim, Chungcheongnam-do (KR)

(73) Assignee: Korea Institute of Industrial Technology, Chungcheongnam-do (KR)

( * ) Notice: Subject to any disclaimer, the term of this patent is extended or adjusted under 35 U.S.C. 154(b) by 25 days.

(21) Appl. No.: 13/877,519

(22) PCT Filed: Sep. 19, 2011

(86) PCT No.: PCT/KR2011/006920
§ 371 (c)(1),
(2), (4) Date: Apr. 29, 2013

(87) PCT Pub. No.: WO2012/046962
PCT Pub. Date: Apr. 12, 2012

(65) Prior Publication Data
US 2013/0236368 A1    Sep. 12, 2013

(30) Foreign Application Priority Data

Oct. 5, 2010  (KR) ................ 10-2010-0097002

(51) Int. Cl.
| | | |
|---|---|---|
| *B01J 19/28* | (2006.01) | |
| *B01J 10/00* | (2006.01) | |
| *C07C 7/20* | (2006.01) | |
| *C07C 5/00* | (2006.01) | |
| *B01J 19/18* | (2006.01) | |
| *C10L 3/10* | (2006.01) | |
| *F17C 11/00* | (2006.01) | |

(52) U.S. Cl.
CPC .............. *B01J 10/00* (2013.01); *B01J 19/1831* (2013.01); *C10L 3/108* (2013.01); *F17C 11/007* (2013.01); *B01J 2219/00094* (2013.01)
USPC ........................................................ 422/162

(58) Field of Classification Search
CPC ............. B01J 19/28; B01J 10/00; C07C 7/20; C07C 5/00
USPC ........................................................ 422/162
See application file for complete search history.

(56) References Cited

U.S. PATENT DOCUMENTS

| | | | | |
|---|---|---|---|---|
| 3,687,919 | A | * | 8/1972 | Thomas ............................ 526/66 |
| 2005/0059846 | A1 | * | 3/2005 | Kohda et al. ..................... 585/15 |
| 2005/0107648 | A1 | | 5/2005 | Kimura et al. |

FOREIGN PATENT DOCUMENTS

| | | | |
|---|---|---|---|
| JP | 2007262185 A | * | 10/2007 |
| JP | 2007-262185 A | | 11/2007 |

OTHER PUBLICATIONS

Machine translation of JP-2007-262185 A—Jun. 26, 2014.*
Patent Examination Report No. 1 in related Australian Patent Application No. 2011313072 dated Jun. 20, 2014.

* cited by examiner

*Primary Examiner* — Walter D Griffin
*Assistant Examiner* — Huy-Tram Nguyen
(74) *Attorney, Agent, or Firm* — Dergosits & Noah LLP

(57) ABSTRACT

A double helix gas hydrate reactor is disclosed. The reactor includes an inlet port (510) into which water and gas are supplied, an outlet port (540) disposed opposite the inlet port, a hollow jacket (580) extending from the inlet port to the outlet port, a hollow outer helix (550) installed in the hollow jacket, and an inner helix (560) installed in the outer helix. The gas and water that are supplied into the inlet port react with each other to form gas hydrate in a channel defined between the inner helix and the hollow jacket.

11 Claims, 8 Drawing Sheets

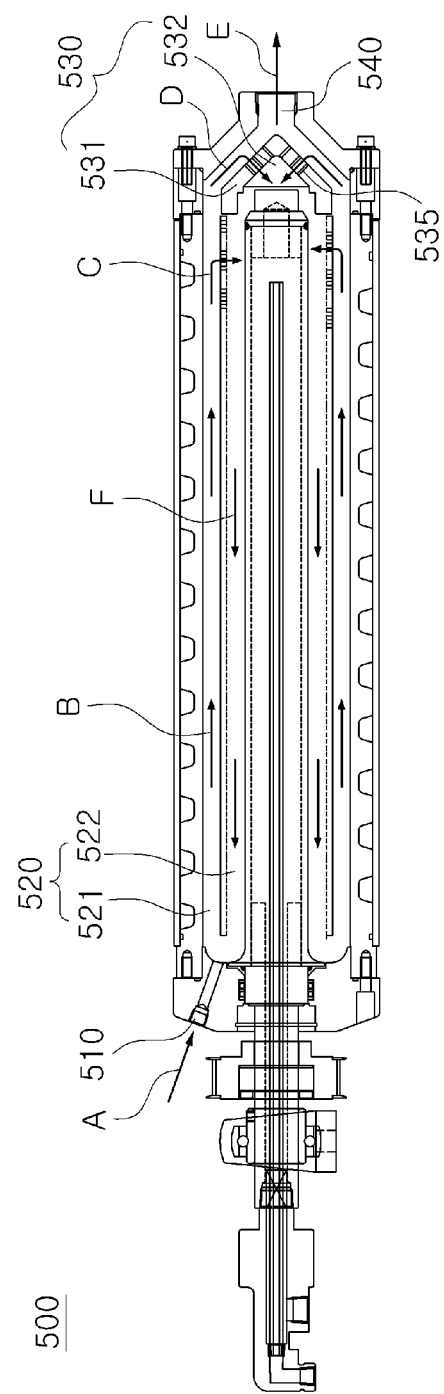

TITLE: DOUBLE HELIX TYPE GAS HYDRATE REACTOR

CROSS-REFERENCE TO RELATED APPLICATIONS

This application is a U.S. National Phase of International Application No. PCT/KR2011/006920 filed on Sep. 19, 2011, which claims priority to and benefit of Korean Patent Application No. 10-2010-0097002 filed on Oct. 5, 2010, which is hereby incorporated by reference in its entirety.

TECHNICAL FIELD

The present invention relates, in general, to gas hydrate reactors and, more particularly, to a double helix gas hydrate reactor which includes an inlet port into which water and gas are supplied, an outlet port disposed opposite the inlet port, a hollow jacket extending from the inlet port to the outlet port, a hollow outer helix installed in the hollow jacket, and an inner helix installed in the outer helix, wherein the gas and water that are supplied into the inlet port react with each other to form gas hydrate in a channel defined between the inner helix and the hollow jacket, the outer helix and the inner helix rotate in the same direction, and the winding direction of an outer helix blade of the outer helix is opposite to the winding direction of an inner helix blade of the inner helix. Further, the present invention relates to a gas hydrate reaction system having the double helix gas hydrate reactor.

BACKGROUND ART

As is well known to those skilled in the art, a clathrate hydrate or gas hydrate comprises two constituents including host molecules forming a hydrogen-bonded solid lattice structure and guest molecules which are trapped inside the hydrogen-bonded solid lattice structure of the host molecules. For example, the clathrate hydrate or gas hydrate is a crystalline compound in which low molecules, such as methane, ethane, carbon dioxide, etc., are physically trapped, without being chemically bonded, inside a three-dimensional lattice structure formed by the hydrogen bonds of water molecules.

About one hundred thirty kinds of guest molecules which can be trapped in the host molecules of gas hydrates have been discovered to date. $CH_4$, $C_2H_6$, $C_3H_8$, $CO_2$, $H_2$, $SF_6$, etc. are representative examples of such guest molecules. Furthermore, gas hydrate crystalline structures have a polyhedral cavity formed by the hydrogen bonded host molecules. According to the kind of gas molecule and the formation conditions thereof, the gas hydrate crystalline structures are classified into a body-centered cubic structure I (sI), a diamond cubic structure II (sII) and a hexagonal structure H (sH). In the sI and sII, the size of a guest molecule is the critical factor. In sH, the size and shape of a guest molecule are the critical factors.

FIG. 1 is a view illustrating a conventional gas hydrate reactor.

A water supply unit 1 and a gas supply unit 2 supply water and gas into a mixing chamber 3. The water and gas are mixed with each other in the mixing chamber 3 before being supplied into a reactor 4.

The reactor 4 must generally create a high-pressure and low-temperature environment although it may vary depending on the conditions used to produce the gas hydrate. Here, the pressure in the reactor 4 is adjusted by the supply of gas. The temperature in the reactor 4 is controlled by adjusting the temperature of a water bath 6.

Gas hydrates are formed in the reactor 4.

Meanwhile, an agitator 5 may be used to promote the formation of gas hydrates. Formed gas hydrates are stored in a gas hydrate storage unit 7.

Although a cooling method in which the water bath 6 is used to meet the low temperature conditions in the reactor 4 is illustrated in FIG. 1, a jacket type cooling method in which the reactor 4 is covered with cooling fluid may be used to satisfy the low temperature conditions.

However, in either the water bath 6 or the jacket type method, the temperature of the outside portion of the reactor 4 can easily be put in a low temperature condition, but the temperature of the central portion of the reactor 4 cannot easily reach the intended low temperature, thus causing there to be a temperature gradient in the fluid in the reactor 4.

Due to this phenomenon, it can be understood from tests for forming gas hydrates that a gas hydrate slurry forms only on the sidewall of the reactor 4 rather than in the central portion of the reactor 4.

As such, if a temperature gradient is caused in the reactor 4, the gas hydrate production rate is reduced.

Furthermore, when the temperature and pressure reach degrees that meet the formation conditions of gas hydrates, some water reacts with some gas to form gas hydrate slurry, but the remnants of water and gas stay in the reactor 4 without reacting with each other. The formed gas hydrate slurry contains a comparatively large amount of water therein, thus requiring a separate dehydration process.

Moreover, if water and gas which are used in the reaction just stay in the reactor 4, the processes of discharging only the formed gas hydrate slurry from the reactor 4 and re-supplying water and gas to compensate for the discharged amount of water and gas are repeated, thus reducing the rate at which gas hydrate is produced.

DISCLOSURE OF INVENTION

Technical Problem

Accordingly, the present invention has been made keeping in mind the above problems occurring in the prior art, and an object of the present invention is to provide a gas hydrate reactor which is configured such that the temperature in the reactor gradient is reduced so that gas hydrate can be uniformly produced on the entire portion of the reactor.

Another object of the present invention is to provide a gas hydrate reactor which is configured such that water is removed from the produced gas hydrate slurry, thus enhancing the rate at which gas hydrate is produced.

A further object of the present invention is to provide a gas hydrate reactor in which water and gas that do not take part in the reaction can be re-circulated effectively, thus increasing the production rate of gas hydrate.

Solution to Problem

In order to accomplish the above objects, in an aspect, the present invention provides a double helix gas hydrate reactor, including: an inlet port into which water and gas are supplied; an outlet port disposed opposite the inlet port; a hollow jacket extending from the inlet port to the outlet port; a hollow outer helix installed in the hollow jacket; and an inner helix installed in the outer helix, wherein the gas and water that are supplied into the inlet port react with each other to form gas hydrate in a channel defined between the inner helix and the hollow jacket, the outer helix and the inner helix rotate in a same direction, and a winding direction of an outer helix blade of the outer helix is opposite to a winding direction of an inner helix blade of the inner helix.

The channel may include: an outer channel formed between the hollow jacket and the outer helix; and an inner channel formed between the outer helix and the inner helix. The outer channel may communicate with the inner channel at a position adjacent to the inlet port.

Furthermore, fluid in the outer channel may flow in a direction from the inlet port to the outlet port because of rotation of the outer helix. Fluid in the inner channel may flow in a direction from the outer port to the inlet port because of rotation of the inner helix.

The outer helix may have at least one opening at a position adjacent to the outlet port. Water of the fluid in the outer channel may flow into the inner channel through the opening.

In addition, at positions adjacent to the outlet port, the outer channel may communicate with an outer outlet channel, and the inner channel may communicate with an inner outlet channel. The outer outlet channel may communicate with the inner outlet channel through a dehydration hole. Water in fluid in the outer outlet channel may flow into the inner outlet channel through the dehydration hole.

Further, a pitch of the outer helix blade may be less than a pitch of the inner helix blade.

The hollow jacket may have a jacket helix groove so that a cooling fluid flows along the jacket helix groove.

In another aspect, the present invention provides a gas hydrate reaction system, including: the double helix gas hydrate reactor described above; a centrifugal separator dehydrating fluid discharged from the double helix gas hydrate reactor; and a gas hydrate storage unit storing gas hydrate from which water is removed by the centrifugal separator.

The gas hydrate reaction system may further include a gas tank storing gas of the fluid discharged from the double helix gas hydrate reactor.

The gas hydrate reaction system may further include a water supply unit supplying water into the inlet port of the double helix gas hydrate reactor, wherein the water removed by the centrifugal separator is supplied into the water supply unit.

Advantageous Effects of Invention

A gas hydrate reactor according to the present invention has a double helix structure such that gas hydrate slurry is effectively discharged to the outside, and water and gas that do not take part in the reaction are re-circulated effectively, thus markedly enhancing the production rate of gas hydrate.

Furthermore, because the operation of dehydrating the gas hydrate slurry is conducted along with the above-mentioned process, the efficiency with which gas hydrate is produced is further enhanced.

In addition, the present invention solves the problem of the conventional technique of a temperature gradient existing between the outer side and the central portion of the reactor. Therefore, gas hydrate can uniformly form throughout the entire portion of the reactor, thus further enhancing the production rate of gas hydrate.

BRIEF DESCRIPTION OF DRAWINGS

FIG. 9 is a view illustrating a process of forming gas hydrates, showing the double helix gas hydrate reactor of FIG. 5 from which an outer helix blade and an inner helix blade were removed.

BEST MODE FOR CARRYING OUT THE INVENTION

Figure 1:
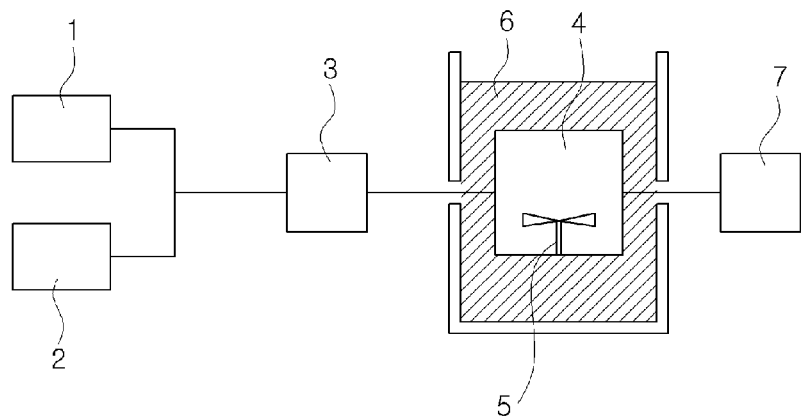
FIG. 1 is a conceptual diagram showing the construction of a conventional gas hydrate reactor.

Hereinafter, a preferred embodiment of the present invention will be described in detail with reference to the attached drawings.

Reference now should be made to the drawings, in which the same reference numerals are used throughout the different drawings to designate the same or similar components.

The term 'gas' denotes guest molecules of a gas hydrate. The term 'water' denotes host molecules. Various kinds of molecules, such as $CH_4$, $C_2H_6$, $C_3H_8$, $CO_2$, $H_2$, $SF_6$, etc. can be used as guest molecules when producing the gas hydrate. Below, such guest molecules will be referred to as gases and the host molecules will be referred to as water ($H_2O$).

Furthermore, because slurry type gas hydrates are formed in a reactor, the terms "gas hydrate slurry" and "gas hydrate" must be understood as denoting the same gas hydrate.

In the following explanation, although a valve will be neither illustrated nor explained in order to simplify the drawings, a valve is preferably disposed on each pipe and each inlet. Particularly, a check valve for preventing back flow and a needle valve for precise control can be used.

Figure 2:
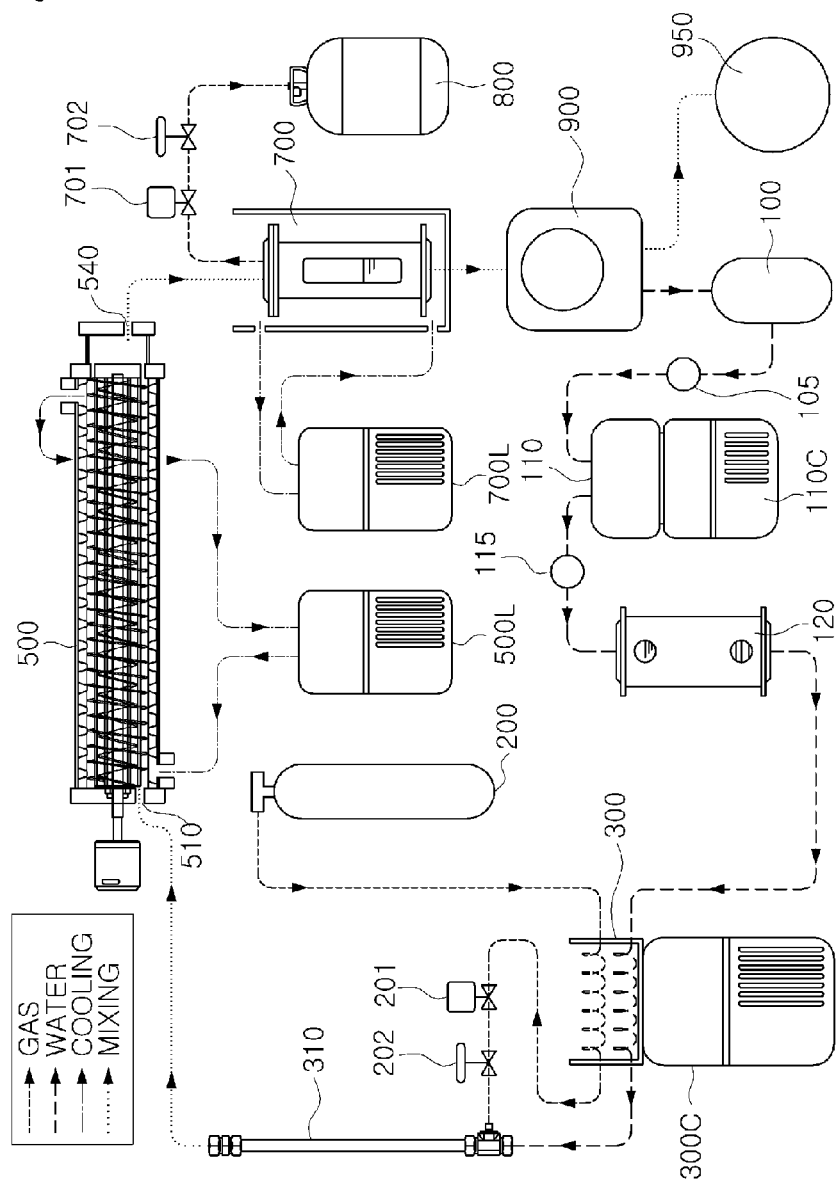
FIG. 2 is a conceptual diagram showing a gas hydrate reaction system including a double helix gas hydrate reactor according to the present invention.

Description of the Construction and Principle of a Double Helix Gas Hydrate Reaction System FIG. 2 is a conceptual diagram showing a gas hydrate reaction system including a double helix gas hydrate reactor 500 according to the present invention. In the drawing, the flow of gas, the flow of water, the flow of cooling fluid and the flow of a gas and water mixture are designated by different types of arrows.

Water is supplied from a water supply unit 100 into a first water tank 110 by a pump 105 and then supplied into a second water tank 120 by a pump 115. During this process, the first water tank 110 is maintained in a low temperature state by the cooling fluid circulation of a cooling fluid circulator 110C.

Low temperature water is moved from the second water tank 120 into a cooling chamber 300 before entering a mixing pipe 310.

Gas is supplied from a gas supply unit 200 into a cooling chamber 300.

The cooling chamber 300 is maintained in a low temperature state by the cooling fluid being circulated by a cooling fluid circulator 300C.

Low temperature gas is moved into the mixing pipe 310 by an actuator 201. Preferably, a check valve 202 is provided on a passage between the cooling chamber 300 and the mixing pipe 310.

Thereby, low temperature water and low temperature gas are mixed with each other to form a gas and water mixture. Due to phase equilibrium conditions, in the above state, most of the gas does not dissolve in the water, that is, gas and water are just in the mixed state.

The gas and water mixture is supplied into the double helix gas hydrate reactor 500 through an inlet port 510. The double helix gas hydrate reactor 500 must maintain the condition of high-pressure depending on the phase equilibrium conditions of the gas hydrate. Here, the double helix gas hydrate reactor 500 is maintained in a low temperature state by the cooling fluid being circulated by a cooling fluid circulator 500C. Preferably, the low temperature state corresponds to formation conditions corresponding to the phase equilibrium conditions of the gas hydrate. The construction and operation of the double helix gas hydrate reactor 500 will be described in detail below.

Fluid that is discharged out of the double helix gas hydrate reactor 500 contains gas hydrate slurry and some water and gas that were not involved in the reaction.

Gas that is contained in the discharged fluid can be collected in a separate gas tank 800 by an actuator 701. Preferably, a check valve 702 is provided on a passage connected to the gas tank 800. The collected gas may be re-supplied into the gas supply unit 200.

Meanwhile, fluid from which gas has been removed contains gas hydrate slurry and water. Such fluid is temporarily stored in the cooling chamber 700. The cooling chamber 700 is maintained in a low temperature state by the cooling fluid being circulated by a cooling fluid circulator 700C, because gas hydrate may dissociate when the temperature goes up.

Thereafter, the fluid that contains gas hydrate slurry and water therein is dehydrated by a centrifugal separator 900. Water that is discharged by the dehydration is resupplied into the water supply unit 100 to be re-supplied into the system.

The gas hydrate slurry from which water was removed is stored in a separate gas hydrate storage unit 950.

Description of the Construction of a Double Helix Gas Hydrate Reactor 500

The construction of the double helix gas hydrate reactor 500 will be explained in detail with reference to FIGS. 3 through 8.

Figure 3:
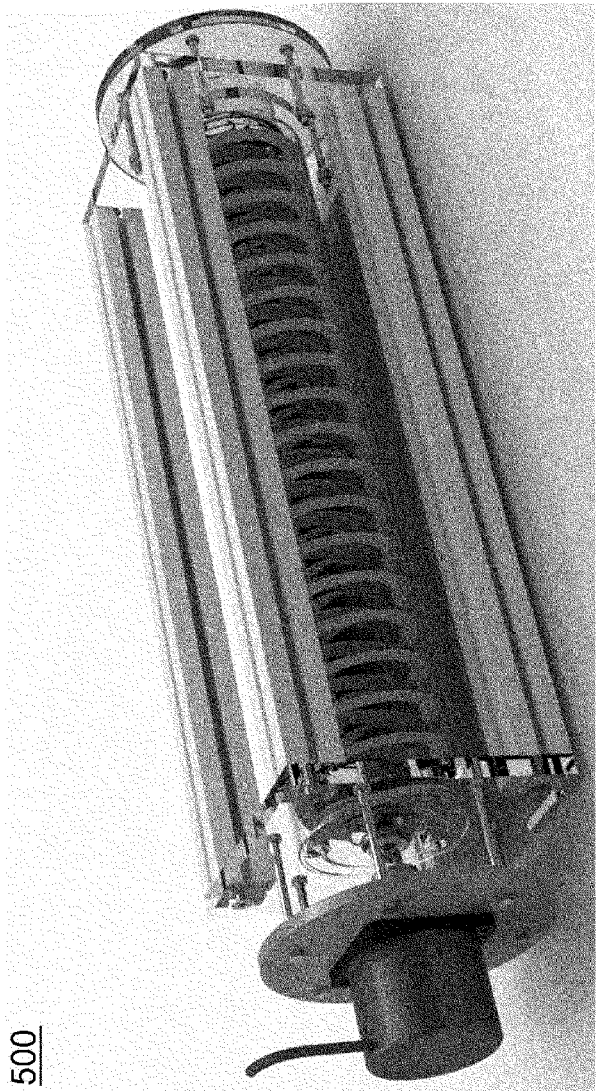
FIG. 3 is a perspective view of the double helix gas hydrate reactor according to the present invention.
Figure 4:
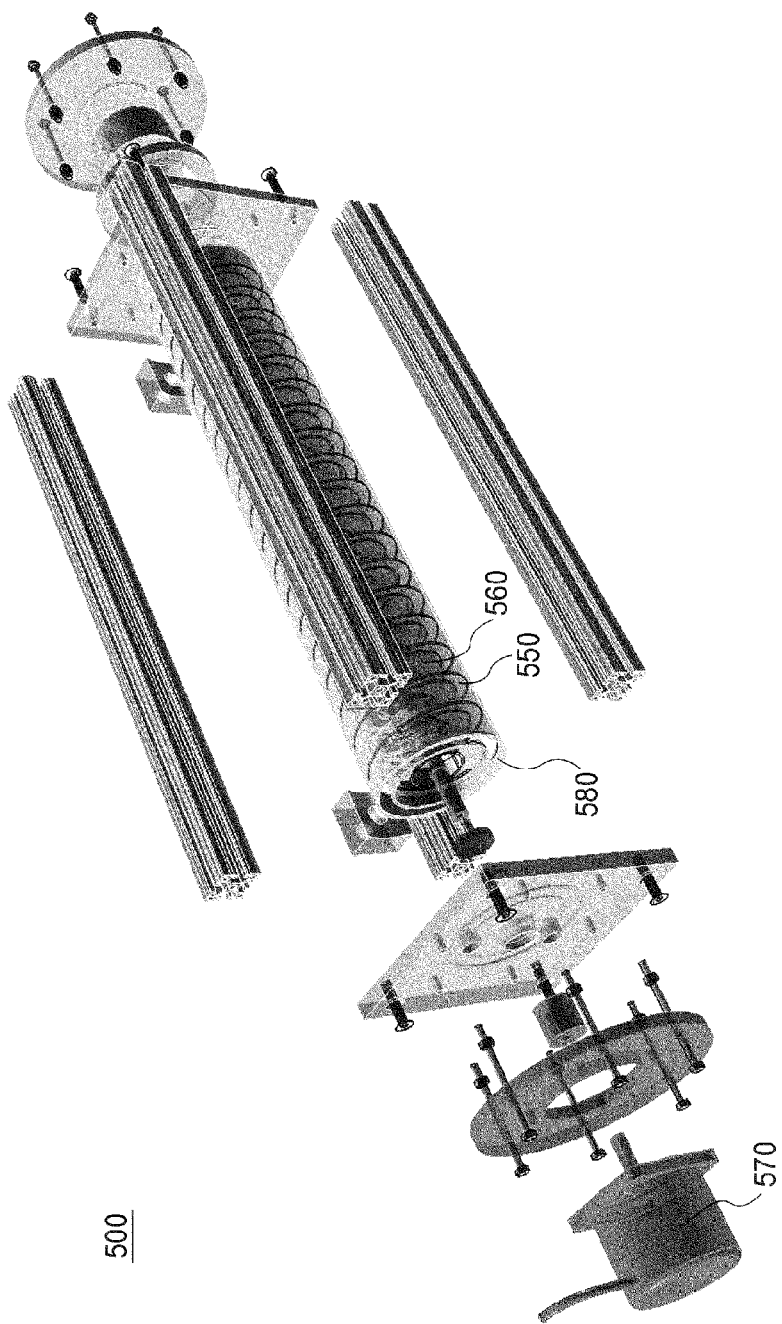
FIG. 4 is an exploded perspective view of the double helix gas hydrate reactor of FIG. 3.

FIGS. 3 and 4 are, respectively, a perspective view and an exploded perspective view showing the double helix gas hydrate reactor 500. Although a plurality of coupling members are illustrated in the drawings, their detailed explanation will be omitted because any type of coupling method can be used.

The body of the double helix gas hydrate reactor 500 includes a hollow jacket 580, a hollow outer helix 550 which is disposed in the hollow jacket 580, and a hollow inner helix 560 which is disposed in the hollow outer helix 550. Preferably, the jacket 580, the outer helix 550 and the inner helix 560 are coaxial.

Preferably, the outer helix 550 and the inner helix 560 are rotated by a single drive unit 570 in the same direction. Of course, the kind of drive unit and the number of drive units may be changed.

Figure 5:
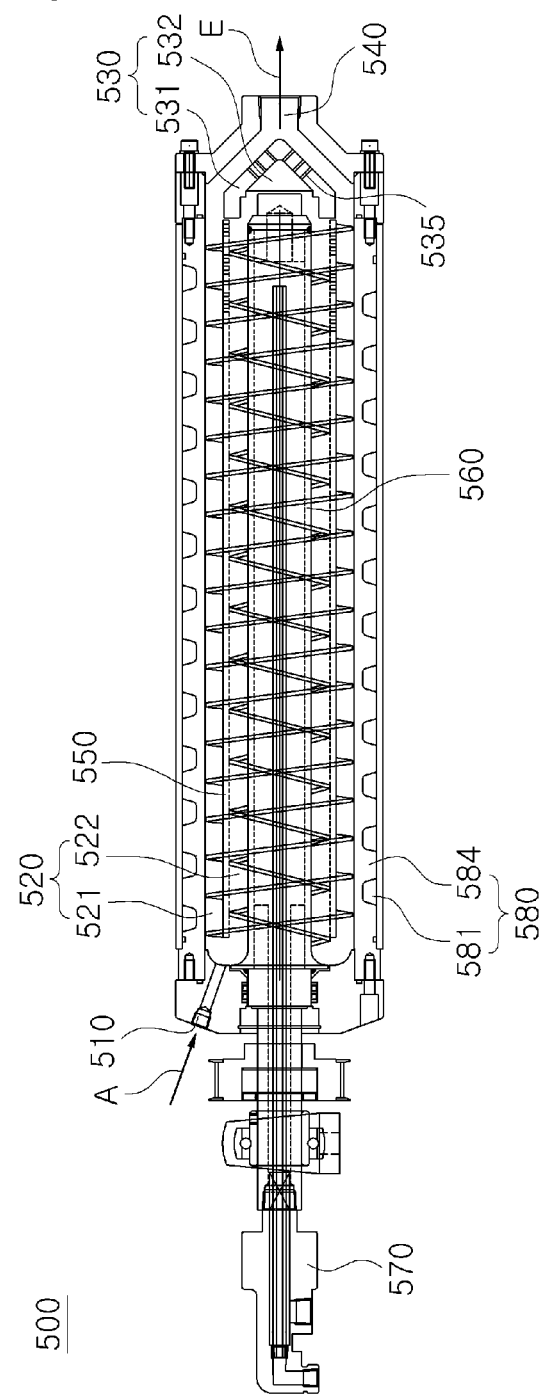
FIG. 5 is a sectional view of the double helix gas hydrate reactor according to the present invention.

The double helix gas hydrate reactor 500 will be explained in more detail with reference to FIG. 5.

As illustrated in the description of FIG. 2, a gas and water mixture is drawn into the double helix gas hydrate reactor 500 through the inlet port 510.

The drawn gas and water mixture flows through a channel 520.

The channel 520 is formed by the jacket 580 and the inner helix 560. In detail, the channel 520 comprises an outer channel 521 which is formed by the jacket 580 and the outer helix 550, and an inner channel 522 which is formed by the outer helix 550 and the inner helix 560.

The gas hydrate slurry which forms in the double helix gas hydrate reactor 500 is discharged out of the double helix gas hydrate reactor 500 through an outlet port 540. In other words, gas hydrate slurry that flows through the channel 520 passes via the outlet channel 530 and the outlet port 540 before being discharged out of the double helix gas hydrate reactor 500.

The outlet channel 530 comprises an outer outlet channel 531 and an inner outlet channel 532 which are partitioned off from each other by a separate partition. The outer outlet channel 531 communicates with the outer channel 521. The inner outlet channel 532 communicates with the inner channel 522.

Furthermore, the outer outlet channel 531 communicates with the inner outlet channel 532 through dehydration holes 535. To promote the dehydration of gas hydrate slurry, each dehydration hole 535 has a size enough to allow water to pass through it but prevent gas hydrate slurry from passing through it. In other words, of the gas hydrate slurry that flows towards the outlet port 540 through the outer outlet channel 531, only water flows into the inner outlet channel 532 through the dehydration holes 535, thus promoting the dehydration of gas hydrate slurry.

Figure 6:
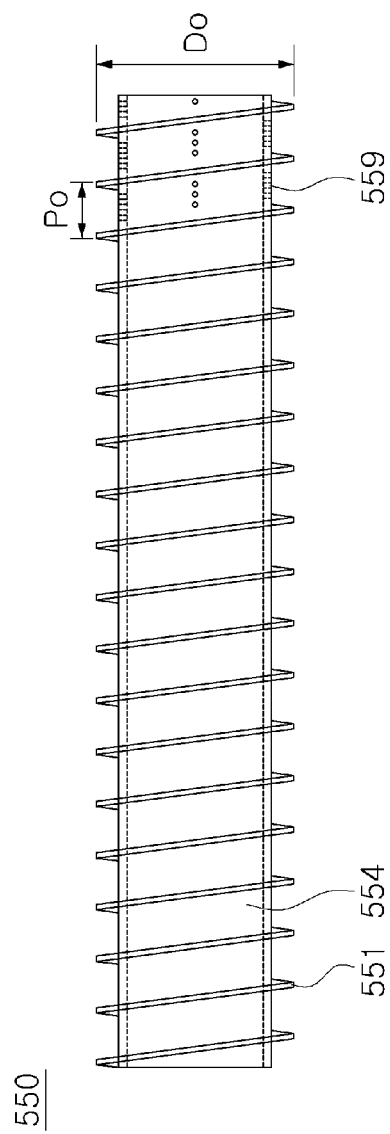
FIG. 6 is a sectional view of an outer helix of the double helix gas hydrate reactor according to the present invention.
Figure 7:
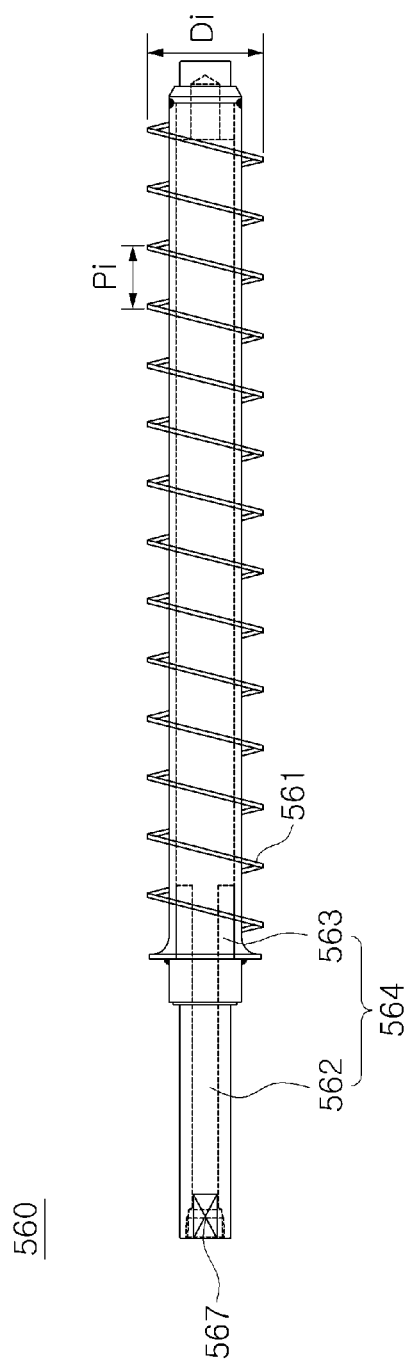
FIG. 7 is a sectional view of an inner helix of the double helix gas hydrate reactor according to the present invention.

The outer helix 550 and the inner helix 560 will be explained in more detail with reference to FIGS. 6 and 7 below.

The outer helix 550 has a hollow shape such that the inner helix 560 is inserted thereinto and is able to rotate. The outer helix 550 includes an outer helix body 554 and an outer helix blade 551. The outer helix 550 is rotated by power transmitted from the drive unit 570 through a separate connector (not shown).

Furthermore, a plurality of openings 559 are formed in the outer helix 550 at positions adjacent to the outlet port 540. To promote the dehydration of gas hydrate slurry, the size of each opening 559 is enough to allow water to pass through it but prevent gas hydrate slurry from passing through it. Preferably, the number of openings 559 is greater than one, but the number of openings 559 is not limited to a special number. The detailed description of this is as follows below.

To insert the inner helix 560 into the outer helix 550, an outer diameter Di of the inner helix 560 must be smaller than an outer diameter Do of the outer helix 550. Further, the inner helix 560 includes an inner helix body 564 and an inner helix blade 561. The inner helix body 564 includes a first inner helix body 562 which is provided with a shaft connector 567 for connecting to the drive unit 570, and a second inner helix body 563 around which the inner helix blade 564 is provided.

The direction of the twisting of the outer helix blade 551 is opposite that of the inner helix blade 561. Thus, even though the outer helix 550 and the inter helix 560 are rotated by the same drive unit 570 in the same direction, the direction in which fluid flows along the outer channel 521 can be made opposite to the direction in which fluid flows along the inner channel 522.

Preferably, a pitch Po of the outer helix blade 551 is less than a pitch Pi of the inner helix blade 561. Thereby, even though the outer helix 550 and the inter helix 560 are rotated by the same drive unit 570 in the same direction, the speed at which fluid flows along the outer channel 521 can be greater than the speed at which fluid flows along the inner channel 522.

Figure 8:
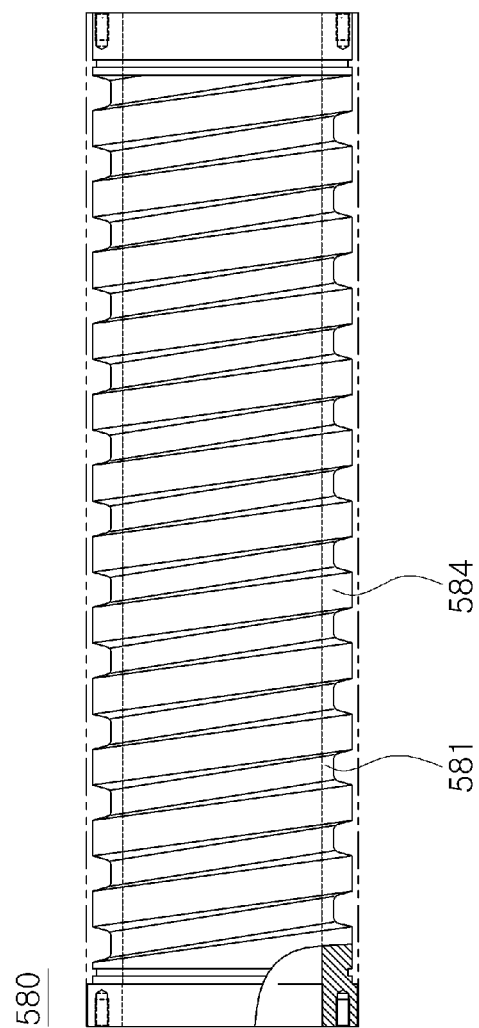
FIG. 8 is a sectional view showing a jacket of the double helix gas hydrate reactor according to the present invention.

The jacket 580 will be explained in detail with reference to FIG. 8.

The jacket 580 has a jacket body 584 and a jacket helix groove 581.

Cooling fluid is supplied into the jacket 580 from a cooling fluid source 500C. The supplied cooling fluid circulates through the jacket helix groove 581 around the entire jacket 580.

That is, unlike the conventional cooling jacket in which fluid simply circulates around the entire jacket, the jacket 580 according to the present invention has the jacket helix groove 581 to increase the contact area between the cooling fluid and the jacket 580, thus enhancing the cooling efficiency.

Description of the Operation Principle of the Double Helix Gas Hydrate Reactor 500

The operation principle of the double helix gas hydrate reactor 500 will be described with reference to FIG. 9. For the sake of description, the outer helix blade 551 and the inner helix blade 561 are not illustrated in FIG. 9.

A gas and water mixture is supplied into the channel 520 of the double helix gas hydrate reactor 500 through the inlet port 510 along the arrow designated by the character A.

In this state, the outlet helix 550 and the inner helix 560 are rotating. Because the outer helix blade 551 and the inner helix blade 561 are wound in opposite directions, fluid is guided from the inlet port 510 towards the outlet port 540 in the outer channel 521, while fluid is guided from the outlet port 540 towards the inlet port 510 in the inner channel 522.

Therefore, the gas and water mixture that is supplied into the channel 520 smoothly flows towards the outlet port 540 through the outer channel 521 along the line designated by the character B. During the above process, the gas and water mixture comes into contact with the inner surface of the jacket 580 that is the lowest temperature portion of the double helix gas hydrate reactor 500, so that the formation of gas hydrate slurry takes place in a manner dependent on the phase equilibrium conditions.

Fluid which has flowed through the outer channel 521 reaches the opening 559 of the outer helix 550 at the end of the outer channel 521. The fluid contains gas hydrate slurry and some water and gas that did not take part in the gas hydrate reaction.

As mentioned above, because the pitch Po of the outer helix blade 551 is less than the pitch Pi of the inner helix blade 561, the speed of fluid in the outer channel 521 is greater than that of fluid in the inner channel 522. Therefore, fluid that flows through the outer channel 521 is biased towards the inner channel 522. Here, because only water can pass through the openings 559 but the gas hydrate slurry cannot pass through the openings 559, some water that has been contained in the fluid moves into the inner channel 522 along the arrow designated by the character C. During such a process, the gas hydrate slurry is partially dehydrated.

Fluid that was primarily hydrated by the openings 559 flows from the outer channel 521 to the outer outlet channel 531 and then is secondarily dehydrated by the same principle in such a way that some water contained in the fluid flows into the inner outlet channel 532 through the dehydration holes 535 along the arrow designated by the character D.

Fluid that was dehydrated twice is discharged out of the double helix gas hydrate reactor 500 through the outlet port 540 along the arrow designated by the character E. This fluid contains gas and water that are not involved in reaction and gas hydrate slurry, but the amount of water was markedly reduced by the two dehydration operations.

Meanwhile, water that is produced by the two dehydration operations is drawn into the inner channel 522 and the inner outlet channel 532 and is mixed with fluid that has been in the channels. The fluid contains a gas and water mixture and gas hydrate slurry.

As mentioned above, the inner channel 522 and the inner outlet channel 532 are oriented towards the inlet port 510 at the outlet port 540 so that fluid that is in these channels 522 and 532 flows towards the inlet port 510 along the arrow designated by the character F.

Thereafter, the fluid is mixed with a gas and water mixture supplied into the inlet port 510 and then flows along the outer channel 521.

The processes expressed by the arrows A through F are repeated so that fluid continuously circulates.

Gas hydrate slurry that is produced by the reaction between gas and water by the above-mentioned principle is continuously discharged to the outside through the outlet port 540. A major portion of gas and water that were not involved in the reaction during the above processes can dynamically circulate in the reactor 500. Thereby, a production rate of gas hydrate can be markedly enhanced.

Furthermore, the two dehydration operations are conducted in the reactor simultaneously with the formation of gas hydrate slurry. Therefore, the water content of the gas hydrate slurry which is discharged to the outside can be markedly reduced.

In addition, because of the principle described above, fluid can continuously circulate in the double helix gas hydrate reactor 500. Particularly, water that is supplied into the inner channel 522 and the inner outlet channel 532 from the outer channel 521 and the outer outlet channel 531 by the primary and secondary dehydration operations is water that has come into contact with the inner surface of the jacket 580. Thus, the temperature of this water is lower than water which has been in the inner channel 522. Therefore, a temperature gradient in the double helix gas hydrate reactor 500 can be reduced so that gas hydrate can form on the entire portion of the reactor, unlike the conventional reactor in which gas hydrate forms only on the outer surface of the reactor.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

The invention claimed is:
1. A double helix gas hydrate reactor, comprising:
an inlet port into which water and gas are supplied;
an outlet port disposed opposite the inlet port;
a hollow jacket extending from the inlet port to the outlet port;
a hollow outer helix installed in the hollow jacket; and
an inner helix installed in the outer helix,
wherein the gas and water that are supplied into the inlet port react with each other to form gas hydrate in a channel defined between the inner helix and the hollow jacket,
the outer helix and the inner helix rotate in a same direction, and
a winding direction of an outer helix blade of the outer helix is opposite to a winding direction of an inner helix blade of the inner helix, wherein the channel comprises:
an outer channel formed between the hollow jacket and the outer helix; and
an inner channel formed between the outer helix and the inner helix,
the outer channel communicating with the inner channel at a position adjacent to the inlet port.

2. The double helix gas hydrate reactor according to claim 1, wherein fluid in the outer channel flows in a direction from the inlet port to the outlet port because of rotation of the outer helix, and
fluid in the inner channel flows in a direction from the outer port to the inlet port because of rotation of the inner helix.

3. The double helix gas hydrate reactor according to claim 2, wherein the outer helix has at least one opening at a position adjacent to the outlet port.

4. The double helix gas hydrate reactor according to claim 3, wherein water of the fluid in the outer channel flows into the inner channel through the opening.

5. The double helix gas hydrate reactor according to claim 1, wherein, at positions adjacent to the outlet port, the outer channel communicates with an outer outlet channel, and the inner channel communicates with an inner outlet channel, and the outer outlet channel communicates with the inner outlet channel through a dehydration hole.

6. The double helix gas hydrate reactor according to claim 5, wherein water in fluid in the outer outlet channel flows into the inner outlet channel through the dehydration hole.

7. The double helix gas hydrate reactor according to claim 1, wherein a pitch of the outer helix blade is less than a pitch of the inner helix blade.

8. The double helix gas hydrate reactor according to claim 1, wherein the hollow jacket has a jacket helix groove so that a cooling fluid flows along the jacket helix groove.

9. A gas hydrate reaction system, comprising:
a double helix gas hydrate reactor according to claim 1;
a centrifugal separator dehydrating fluid discharged from the double helix gas hydrate reactor; and
a gas hydrate storage unit storing gas hydrate from which water is removed by the centrifugal separator.

10. The gas hydrate reaction system according to claim 9, further comprising:
a gas tank storing gas of the fluid discharged from the double helix gas hydrate reactor.

11. The gas hydrate reaction system according to claim 9, further comprising:
a water supply unit supplying water into the inlet port of the double helix gas hydrate reactor,
wherein the water removed by the centrifugal separator is supplied into the water supply unit.

* * * * *